United States Patent [19]  [11] 4,009,478
Yamashita  [45] Feb. 22, 1977

[54] FILM ADVANCE AND METERING MECHANISM FOR CAMERAS

[75] Inventor: Maki Yamashita, Osaka, Japan

[73] Assignee: Minolta Camera Kabushiki Kaisha, Osaka, Japan

[22] Filed: Sept. 4, 1975

[21] Appl. No.: 610,348

[30] Foreign Application Priority Data

Sept. 6, 1974 Japan .................... 49-101956

[52] U.S. Cl. ............................ 354/206; 354/213
[51] Int. Cl.² ............................ G03B 1/22
[58] Field of Search .......... 354/212, 213, 206, 204

[56] References Cited

UNITED STATES PATENTS

| 3,820,143 | 6/1974 | Keiner | 354/206 |
| 3,852,784 | 12/1974 | Stoneham | 354/206 |
| 3,906,530 | 9/1975 | Oshima | 354/206 |

FOREIGN PATENTS OR APPLICATIONS 574,396 4/1959 Canada ................ 354/204

Primary Examiner—Edna M. O'Connor
Attorney, Agent, or Firm—Wolder & Gross

[57] ABSTRACT

A still camera for use with film having a row of perforations, one for each film frame, has a manually operated film advancing mechanism and a metering mechanism for selectively disabling the advancing mechanism. A lock mechanism retains an intermediate gear at the position where the gear transmits the movement of the manual film advancing member to a film wind-up gear for the film transportation. A sensing pawl releases the intermediate gear and disconnects the same from a transmission train between the manual member to the film wind-up gear to disable the film transportation when the sensing pawl detects a perforation and is slightly moved thereby.

10 Claims, 2 Drawing Figures

FILM ADVANCE AND METERING MECHANISM FOR CAMERAS

BACKGROUND OF THE INVENTION

The present invention relates to a film advance and metering mechanism for cameras of the type used with film having a row of perforations, one for each film frame.

It has been known, for example, in U.S. Pat. Nos. 3,747,494 and 3,736,854 to stop the film transportation by sensing the perforations which are provided one for each film frame on the film. However, most of those known film metering mechanisms are so constructed that a pawl engages a film wind-up gear or ratchet gear interlocked therewith and stop the film transport operation in response to the detection of a perforation. Hence, the known mechanisms have the disadvantage that the amount of film advance varies in accordance with the speed at which the film is manually wound up. In this case, the higher the speed the greater the length of film is wound up, because it takes some time to bring the pawl into engagement with the wind-up gear after a perforation is detected and it sometimes occurs that the ratchet gear rotating at a high speed flips the pawl. Another reason for the difference in the amount of film transportation is that meshing of the pawl with the gear results in stopping a film at incrementally spaced intervals with respect to the amount of film transportation.

Further, the known mechanisms have the additional disadvantage that the film is sometimes broken by a perforation sensing member when, after the sensing member enters a perforation, film is still advanced due to improper timing between the entering of the sensing member and the meshing of the pawl. This condition may occur more frequently in the case where the top of the pawl meets a top of a gear tooth or is advanced just after the passage of the top of the tooth at the beginning of the meshing, because the film is further advanced after the entering of sensing member, i.e., commencement of the meshing, until the top of the pawl is brought into contact with the front edge of the next tooth. In those cases, even if the film is not broken, the film may be distorted and the flatness of the film at the exposure position may be spoiled.

SUMMARY OF THE INVENTION

The primary object of the present invention is to provide an improved film transport and metering mechanism which effects the metered advance of a constant amount of film without any breakage or distortion of film.

According to the present invention, the film transport and metering mechanism comprises an operating member operable to transport the film means for winding up the film, an intermediate member moveable between a first position for interconnecting the film wind-up means with the operating member to transmit the movement of the latter to the former and a second position for disconnecting the film wind-up member from the operating member, means for retaining the intermediate member in its first position, a sensing member for sensing a perforation in the film and means for releasing of the intermediate member and retracting the same to its second position.

In the above described mechanism, the film wind-up mechanism is not locked or restrained upon and after the stopping of the film transportation, but is released and retracted so it is possible for the film to be loosened.

Accordingly, another object of the present invention is to provide a film transport and metering mechanism with means for restraining the advance of the film at least during film exposure.

According to the preferred embodiment of the present invention, the sensing member includes a lever having a portion enter a perforation and which is locked by locking means to restrain the advance of the film. The restraint of the film may be released by disengaging the lever from the perforation at an early stage of film wind-up operation.

Other and further objects, features and advantages of the present invention will become obvious upon an understanding of the illustrative embodiments hereinafter described or will be indicated in the appended claims, and various advantages not referred to herein will occur to one skilled in the art upon application of the invention.

DESCRIPTION OF THE PREFERRED EMBODIMENT

Figure 1:
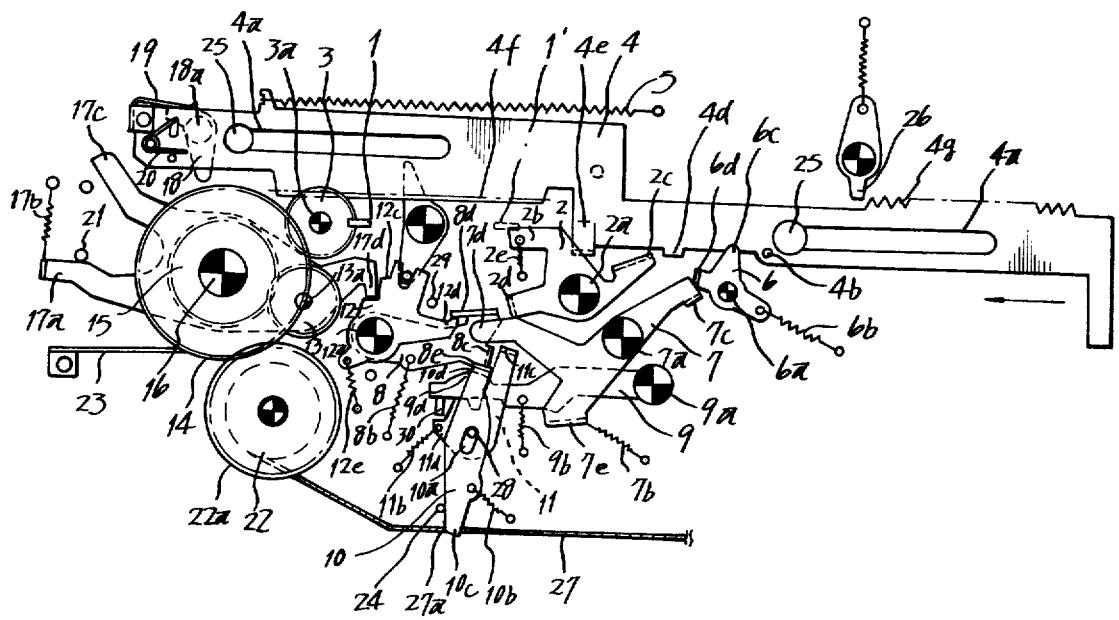
FIG. 1 is a side elevational view of the essential part of one embodiment of the present invention shown in shutter cocked condition.

Referring now to the drawings which illustrate a preferred embodiment of the present invention, the reference numeral 4 designates a winding operating member 4 which cooperates with a manual operating portion such as a winding lever (not shown) or the like, and is slideable either to the right or to the left, as viewed in the drawing, along a longitudinal guide groove 4a, in operating member 4 in which are loosely fitted guide pins 25. The member 4 is resiliently biased to be positioned in its retracted rightward rest position by means of a spring 5. A stop pin 4b is located on the winding operating member 4 which is formed with a depending projection 4d on its lower edge, as well as a bent piece 4e. In addition, the member 4 is formed with a rack 4f on its lower edge, which rack is positioned to the left to the bent piece 4e, the rack 4f being maintained in meshing relation with a gear 3 which is rotatable on a shaft 3a secured to the body of the camera. In addition, the member 4 is formed with a rack or teeth 4g having a length shorter than that of the rack 4f, on the upper edge of the member 4 to the right of the bent piece 4e, the rack 4g being engageable with a reverse movement preventive pawl 26 which is so biased as to be directed towards the teeth 4g perpendicularly thereof and is pivoted to the body of the camera. In this respect, the engagement of the rack teeth 4g with the pawl 26 is so designed as to be released in the rest position of the winding operating member 4 as well as in its operable position, i.e., at the end position of the member 4 which has been moved in the direction of the arrow. An actuating pawl 18 is supported on a shaft 18a at the left of the winding operating member 4, and is biased to be directly downwardly by means of springs 19 and 20.

A charge lever 1 is moveable to a release position shown by a broken line 1' in FIG. 1, as well as to a charge position shown by a solid line, and is so designed as to move from its charge position to its release position, upon release operation of a shutter, being engageable with the bent piece 4e of the winding operating member 4 which is manually motivated.

A winding preventive lever 2 is rotatably supported on a shaft 2a and so loaded as to rotate in a counter-clockwise direction by means of a spring 2e, and rotates in a clockwise direction against the action of the spring 2e, by the engagement of its first arm 2b with the charge lever 1 which has been released, so that its second arm 2c releases the winding operating member 4 from its locked condition effected by the arm 2c, the second arm 2c normally engaging a projection 4d on the winding operating member 4 in its rest position to thereby stop the leftward movement of the member 4 to its operable position. The lever 2 in addition is formed with a third arm 2d which engages a set lever 7, hereinafter described, in a manner to normally urge the same in a counter-clockwise direction, and the third arm 2d releases the set lever 7 from its urged condition, when the lever 2 is rotated in a clockwise direction, as has been described above.

A winding operation detecting pawl 6 is rotatably supported on a shaft 6a and is biased by a spring 6b to bring its pawl tooth 6c into engagement with the pin 4b. A bent piece 6d on the winding operation detecting pawl 6 is adapted to engage a first arm 7c of the set lever 7 which is rotatably supported on a shaft 7a and is biased by a spring 7b to rotate in a counter-clockwise direction. The set lever 7 is engageable with the third arm 2d of the lever 2. In addition, the set lever 7 is formed with a second arm 7d which is adapted to engage a connecting lever 8 described hereinafter, when the set lever 7 is rotated in a clockwise direction, and with a third arm 7e which is engageable with a sensing set lever 9. The sensing set lever 9 is rotatably pivoted on a shaft 9a and is biased by a spring 9b to rotate in a counter-clockwise direction. However, the lever 9 normally abuts a stop 30 and engages the third arm 7e so as to be rotated in a clockwise direction against the action of a spring 9b, when the set lever 7 is rotated in a clockwise direction against the action of the spring 7b.

A shaft 28 secured to the body of a camera is loosely fitted in a guide groove 10a formed in a sensing lever 10, and the sensing lever 10 may be rotated about the shaft 28 as well as slide along the guide groove 10a. A sensing element or tip 10c on the lever 10 is urged against a film 27 by means of a spring 10b in a manner that the sensing element 10c may be fitted in or engage a perforation 27a. In addition, the lever 10 is biased by the spring 10b to rotate in a counter-clockwise direction so that the bent piece 10d formed on the other end of the sensing lever 10 may engage an arm end 9d on the sensing set lever 9. A retaining condition release lever 11 is mounted on the shaft 28 and biased by a spring 11b to rotate in a clockwise direction. Thus, the lever 11 engages the side edge of the bent piece 10d, a bent piece 11c on its tip portion being maintained projecting from the bent piece 10d at all times.

A large diameter gear 14 and a small diameter gear 15 are coaxially rotatably mounted on a shaft 16 secured to the body of a camera, and a gear lever 17 having three arms is likewise rotatably supported on the shaft 16. A spring 17b is connected between a first arm 17a of the lever 17 and the body of a camera and biases the lever 17 to rotate in a clockwise direction, and the lever 17 is normally in abutment with a stop 21. A second arm 17c of the lever 17, in the above condition, extends to a position in the path of and engageable with the actuating pawl 18, while a projection 17d on a third arm of the lever 17 engages a retaining lever 12, described later. An actuating gear 13 is journalled to the third arm of the lever 17 by means of a shaft 13a and normally engages the small diameter gear 15, being retracted away from the gear 3 in the rest position of the gear lever 17 when it has been rotated to its clockwise position. The actuating gear 13 assumes its operable position, wherein the gear 13 meshes with the gear 3, when the gear lever 17 rotates in a counter-clockwise direction against the action of the spring 17b. A connecting lever 8 is rotatably supported on a shaft 12a and is biased by a spring 8b to rotate in a clockwise direction, and is formed with a bent piece 8d which is engageable with the arm 7d of the set lever 7 and is formed as well with a bent portion 8c which is engageable with the bent pieces 10d and 11c of the levers 10 and 11 respectively. Supported on the shaft 12a is retaining lever 12 which is biased by a spring 12e to rotate in a counter-clockwise direction. The retaining lever 12 is formed with a retaining shoulder portion 12c which is engageable with the projection 17d on the gear lever 17, depending on the rotated position of the lever 12, and is formed as well with a pawl portion 12d which is engageable with the bent piece 8d of the connecting lever 8.

In engagement with the large diameter gear 14 is a reverse rotation preventive pawl 23 which prevents its rotation in a clockwise direction, the gear 14 meshing with a winding gear 22a affixed to a winding shaft 22, on which is to be wound a film 27.

In accordance with the improved mechanism described above, the second arm 2c of the winding operation preventive lever 2 in the winding completed condition as shown in FIG. 1 stops the leftward movement of the winding operating member 4 by engaging the projection on the winding operating member 4, thus preventing double winding of a film.

Under such a condition, when a shutter is released, then the charge lever 1 moves from its charge position to its release position 1', thereby rotating the winding preventive lever 2 in a clockwise direction so as to release the winding operating member from its stopped or retracted condition as effected by the second arm 2c of the lever 2. Then, when the winding operating member 4 is pushed to its advanced or operable position against the action of the spring 5, then the reverse movement preventive pawl 26 meshes with the rack 4g in the condition where the pawl 26 has been rotated in a clockwise direction as shown in FIG. 2, thereby stopping the reverse or retraction movement of the winding operating member 4, while the gear 3 is rotated in a counter-clockwise direction.

The aforesaid winding operation causes the pin 4b to engage the winding operation detecting pawl 6 to rotate the pawl in a counter-clockwise direction, and the bent piece 6d of the pawl 6 engages the first arm 7c of the set lever 7 to rotate same in a clockwise direction against the action of the spring 7b, whereupon the second arm 7d, engages the bent piece 8d of the connecting lever 8 to rotate same in a counter-clockwise direction against the action of the spring 8b. In addition, the third arm 7e of the set lever 7 engages the sensing set lever 9 to rotate the lever 9 in a clockwise direction.

The sensing lever 10 having the bent piece 10d which engages the arm end 9d of the sensing set lever 9 rotated clockwise, as above, is raised along the shaft 28 so that the sensing element 10c thereof is withdrawn from the perforation 27a defined in the film 27, whereupon the element 10c is rotated in the counter-clockwise direction under the action of the spring 10b.

Figure 2:
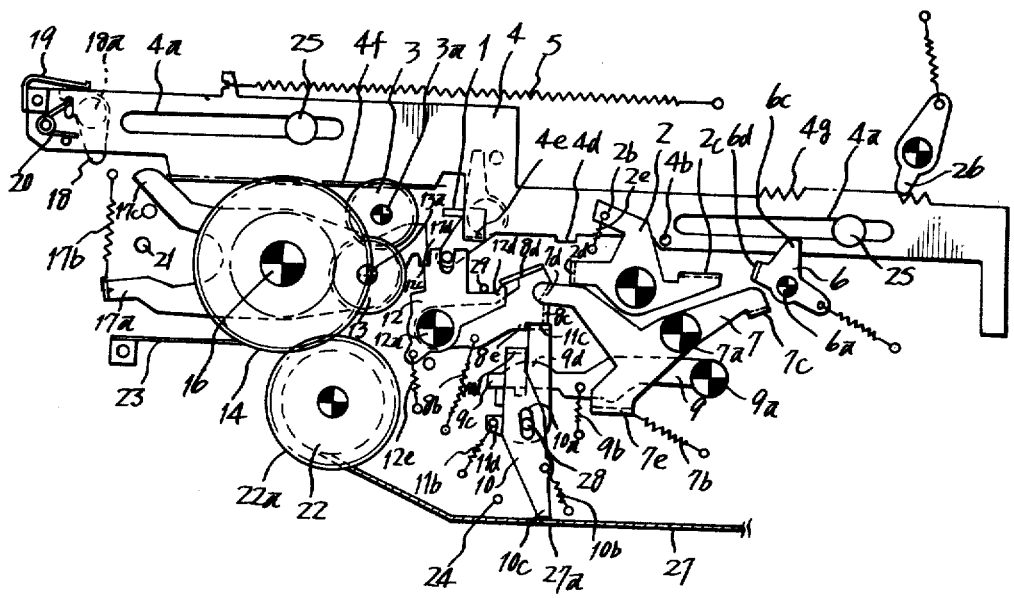
FIG. 2 is a side elevational view of the same but shown in a winding condition prior to the completion of winding of a film.

At this time, the actuating pawl 18, which is rockable on the winding operating member 4 and so loaded by the springs 19 and 20 as to be directed downwardly, engages the second arm 17c of the gear lever 17 to rotate the gear lever 17 in a counter-clockwise direction against the action of the spring 17b, so that the actuating gear 13 meshes with the small diameter gear 15 and revolves about the shaft 16 into the meshing engagement with the gear 3, and the projection 17d engages the retaining shoulder portion 12c of the retaining lever 12, thus maintaining the aforesaid meshing relation, as seen in FIG. 2.

As a result, the rotation of the gear 3 which is effected by the aforesaid winding operation is transmitted to the winding gear 22a through the medium of actuating gear 13, small diameter gear 15 and large diameter gear 14, while the reverse rotation of the gear 3 is prevented by means of the reverse rotation preventive pawl 23, with the film 27 being wound on the winding shaft of reel 22.

When the film is wound in the aforesaid manner, the next successive film perforation 27a, as shown in FIG. 2, advances into registry with the sensing element 10c, so that the sensing element 10c is advanced into engagement with the perforation 27a by means of the spring 10b, being rotated in a clockwise direction against the action of the spring 10b, as the film 27 is advanced or wound, whereupon the winding release lever 11, as well, rotates in the same direction. When the film has been wound an increment frame, then the bent portion 8c of the connecting lever 8 is disengaged from the bent piece 11c of the winding release lever 11 so as to drop on the bent piece 10d of the sensing lever 10 by means of the spring 8b, as shown in FIG. 1, and the bent piece 8d urges the pawl portion 12d to rotate the retaining lever 12 in a clockwise direction, so that the projection 17d on the gear lever 17, which engages the retaining shoulder portion 12c, is released from its locked condition. As a result, the lever 17 is immediately rocked in a clockwise direction by the spring 17b to a position engaging the stop 21. Accordingly, the meshing relation between the actuating gear 13 and the gear 2 is interrupted, so that even if the winding operating member 4 moves to the left, the winding operation of the film is disabled, while the shutter charge lever 1 is charged to the charge position shown in FIG. 1.

Meanwhile, springs 19 and 20, which hold the actuating pawl 18, damps any impact created when the actuating gear 13 meshes with the gear 3, due to the counter-acting actions of both springs 19 and 20.

As is apparent from the foregoing description, the winding operation may be completed only due to the advancing movement of the winding operating member, and yet the stoppage of the film against the winding, upon completion of the winding of the film by one frame, is free from impact, because the winding operation is not forcedly locked by means of a locking member, thus permitting a smooth winding operation without uncomfortable feeling, while the durability of a camera mechanism, particularly the film winding mechanism, is greatly enhanced.

While there has been described and illustrated a preferred embodiment of the present intention, it is apparent that numerous alterations, additions and omissions may be made without departing from the spirit thereof.

I claim:

1. In a camera loaded with a film having a row of longitudinally spaced perforations, one for each frame, a film transport and metering mechanism comprising:
   an operating member operable for transporting said film;
   a sensing member for sensing a perforation of said film;
   film wind-up means for winding-up said film;
   intermediate means releasably connected with said operating member for transmitting the operation of said operating member to said film wind-up means;
   means for retaining the connection of said intermediate means with said operating member; and
   means for releasing the retention of said intermediate means by said retaining means upon the detection of a perforation of said film by said sensing member.

2. A film transport and metering mechanism as claimed in claim 1, further comprising means for biasing said intermediate means to a position wherein said intermediate means is disconnected from said operating member.

3. A film transport and metering mechanism as claimed in claim 2, wherein said sensing member includes a rotatable and movable first lever biased to engage the surface of said film, said first lever being movable from
   a. a first position where it engages the surface of said film through
   b. a second position where it enters a perforation of said film to
   c. a third position where it is rotated a predetermined angle entering said perforation as said film is advanced, and wherein said releasing means includes:
      a second lever biased to bear against said first lever and rotatable with said first lever; and
      a third lever locked by said second lever when said first lever is in its first and second position and released from the locking when said first lever is moved to its third position, said third lever being coupled with said retaining means and biased to move for releasing the retention of said intermediate means by said retaining means when released from the locking.

4. A film transport and metering mechanism as claimed in claim 3 further comprising a first gear means moveable with the operation of said operating member and a second gear means rotatable with said film wind-up means, and wherein said intermediate means includes a third gear means and a fourth lever carrying said third gear means and moveable from a first position for interconnecting said first and second gears through said third gear means to a second position for disconnecting said first and second gear means.

5. A film transport and metering mechanism as claimed in claim 4 further comprising means for bringing said fourth lever from the second to the first position thereof in response to the actuation of said operating member.

6. A film transport and metering mechanism as claimed in claim 5 wherein said retaining means includes a retaining lever for retaining said fourth lever in the first position thereof, said retaining lever being biased to move to its fourth lever retaining position, said third lever allowing said retaining lever to move to its retaining position with said third lever, when it is in its second position.

7. A film transport and metering mechanism as claimed in claim 6 further comprising means for bringing said third lever from the first to second position thereof and disengage said portion of said first lever from a perforation in response to the actuation of said operating member.

8. A film transport and metering mechanism as claimed in claim 2 wherein said sensing member includes a lever which is so arranged as to engage a film perforation when the perforation advances into registry therewith; and said film transport and metering mechanism further comprises means for restraining the lever at least during film exposure and means for disengaging said lever from the perforation in response to actuation of said operating member.

9. A film transport and metering mechanism as claimed in claim 8 wherein said camera includes a shutter movable to a cocked position and further comprising a preventing member for preventing the operation of said operating member and a shutter cocked responsive member being at a first position with the camera shutter in a cocked condition for allowing said preventing member to prevent the operation of said operating member and a second position with the camera shutter released.

10. A film transport and metering mechanism as claimed in claim 1, wherein said sensing member includes a rotatable and movable lever biased to engage the surface of said film, said lever being movable from
   a. a first position where it engages the surface of said film through
   b. a second position where it enters a perforation of said film to
   c. a third position where it is rotated a predetermined angle with entering said perforation as said film is advanced.

* * * * *